(12) United States Patent
Lai (10) Patent No.: US 8,665,586 B2
(45) Date of Patent: Mar. 4, 2014

(54) DISPLAY DEVICE

(75) Inventor: Chun-feng Lai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 658 days.

(21) Appl. No.: 12/949,315

(22) Filed: Nov. 18, 2010

(65) Prior Publication Data

US 2012/0127639 A1    May 24, 2012

(51) Int. Cl.
*H05K 5/00*    (2006.01)
(52) U.S. Cl.
USPC .............. 361/679.21; 361/679.26; 361/679.3; 349/58; 349/60
(58) Field of Classification Search
USPC ................. 361/679.21–679.3; 349/58, 60
See application file for complete search history.

(56) References Cited

U.S. PATENT DOCUMENTS

| | | | | |
|---|---|---|---|---|
| 6,151,207 | A | * 11/2000 | Kim | 361/679.26 |
| 2011/0018823 | A1 | * 1/2011 | Moon | 345/173 |

FOREIGN PATENT DOCUMENTS

JP          05035403 A  *  2/1993   ............. G06F 3/033

\* cited by examiner

*Primary Examiner* — Ramon Barrera
(74) *Attorney, Agent, or Firm* — Muncy, Geissler, Olds & Lowe, P.C.

(57) ABSTRACT

A display device is provided, including a front case, a rear case fixed to the front case, a frame disposed between the front and rear cases, a display panel disposed on the frame, and a cushion. The cushion is disposed on the frame and contacts the front and rear cases, so as to space the frame apart from the front and rear cases.

18 Claims, 9 Drawing Sheets

DISPLAY DEVICE

BACKGROUND OF THE INVENTION

1. Field of the Invention

This application relates in general to a display device and in particular to a thin display device having a cushion to absorb impact shock.

2. Description of the Related Art

Figure 1:
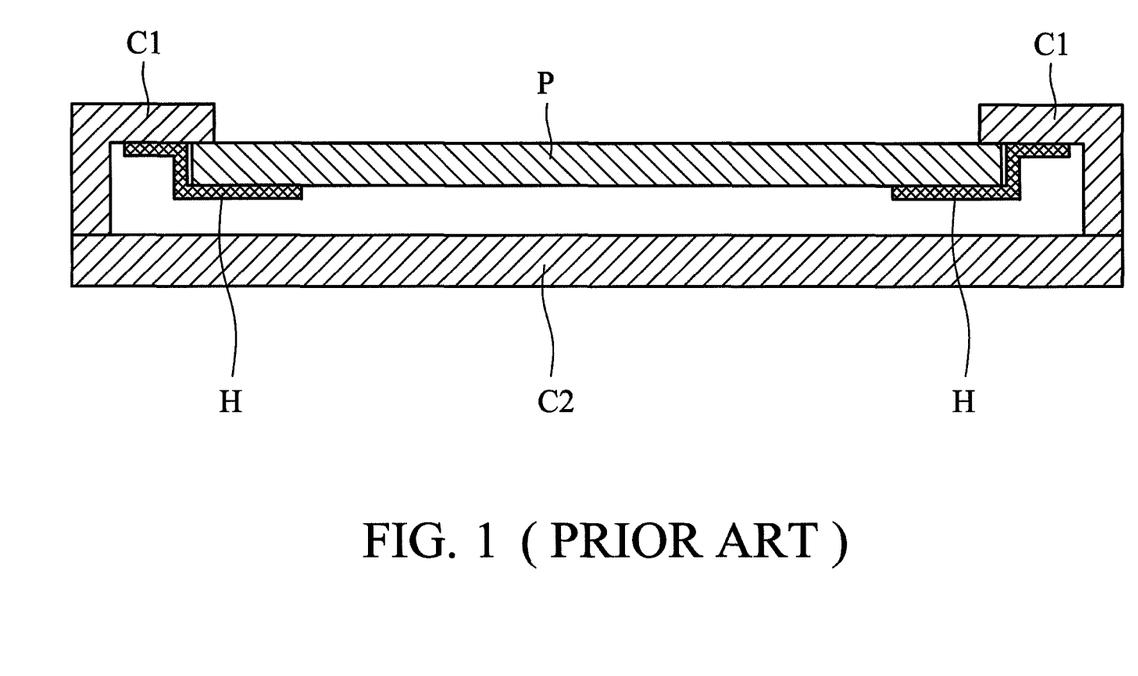
FIG. 1 is a sectional view of a conventional display device.

E-readers or e-book devices are thin display devices capable of displaying text and images on a screen. Thus, they are electronic versions of printed books. Referring to FIG. 1, a conventional thin display device, such as an e-reader, primarily comprises a front case C1, a rear case C2 fixed to the front case C1, a display panel P, and a metal fixture F fixing the display panel P to the front case C1. When the display device is impacted by an external force or drops to the ground, a shock wave due to the impact is directly transmitted from the front and rear cases C1 and C2 to the display panel P. Hence, structural damage of the display panel P may occur and lead to functional failure thereof.

BRIEF SUMMARY OF INVENTION

The application provides a display device including a front case, a rear case fixed to the front case, a frame disposed between the front and rear cases, a display panel disposed on the frame, and a cushion. The cushion is disposed on the frame and contacts the front and rear cases, so that the frame is spaced apart from the front and rear cases. Thus, shock waves, due to impact, transmitted from the front and rear cases to the display panel can be decreased to prevent structural damage of the display panel.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 2A:
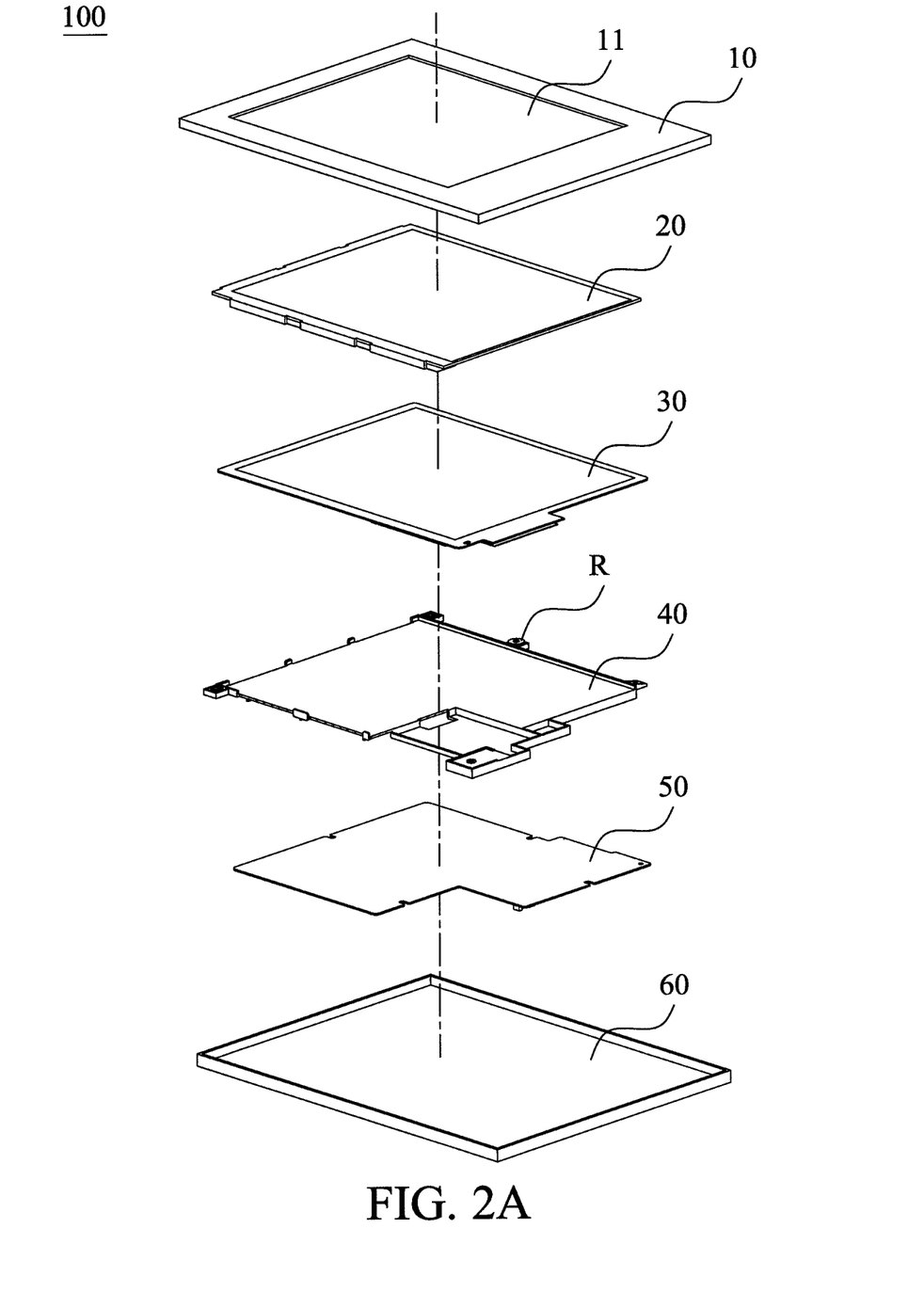
FIG. 2A is an exploded diagram of a display device according to an embodiment of the invention.
Figure 2B:
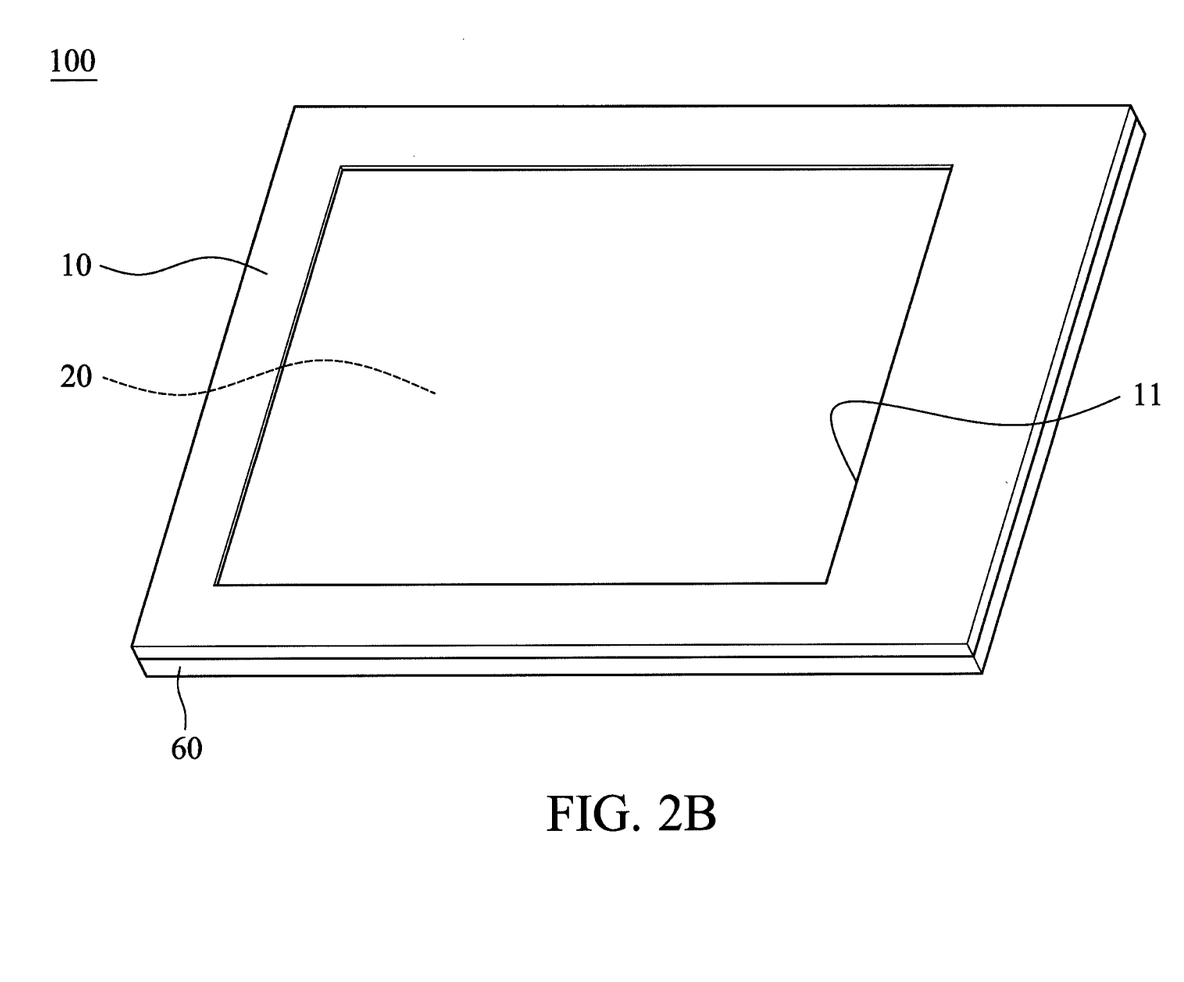
FIG. 2B is a perspective diagram of the display device in FIG. 2A.

FIG. 2A depicts an embodiment of a display device 100, such as an e-reader or e-book device. The display device 100 primarily comprises a front case 10, a display panel 20, a touch panel 30, a frame 40, a circuit board 50, a rear case 60, and at least a cushion R disposed on the frame 40. The rear case 60 is fixed to the front case 10, and the frame 40 is disposed between the front and rear cases 10 and 60 to hold and support the display and touch panels 20 and 30. The circuit board 50 is situated below the frame 40 and electrically connected to the display and touch panels 20 and 30 for displaying text or images on a screen and for inputting signals by an user touching through the display and touch panels. As shown in FIG. 2B, the display panel 20 is housed by the front and rear cases 10 and 60 and is visible through an opening 11 of the front case 10 for viewing.

Figure 3A:
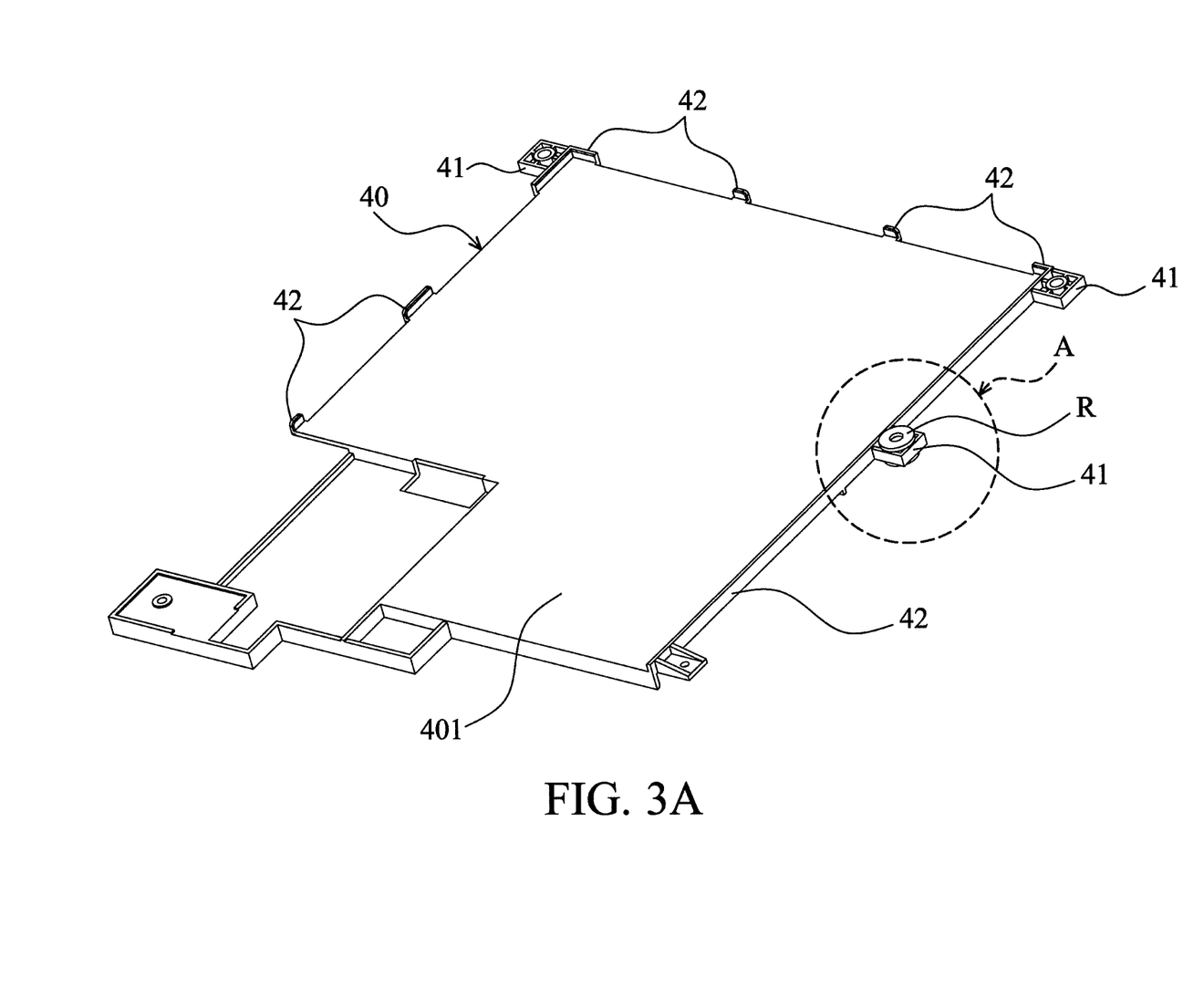
FIG. 3A is a perspective diagram of a frame with a cushion disposed thereon according to an embodiment of the invention.

Referring to FIG. 3A, the frame 40 comprises a main body 401 and a plurality of tabs 41 and flanges 42 protruding from the main body 401. In this embodiment, the tabs 41 are extended horizontally from the main body 401. The flanges 42 are formed at the edges of the frame 40 and protrude vertically from the main body 401 to position the display and touch panels 20 and 30 on the main body 401. As shown in FIG. 3A, the cushion R is disposed through the tab 41 to contact the front and rear cases 10 and 60, thus decreasing external shock waves which may be directly transferred from the front and rear cases 10 and 60 to the display and touch panels 20 and 30, wherein the display and touch panels 20 and 30 doesn't directly contact the front and rear cases 10 and 60. In some embodiments, the cushion R may comprise rubber, and the frame 40 may comprise plastic material including carbon fiber or glass fiber.

Figure 3B:
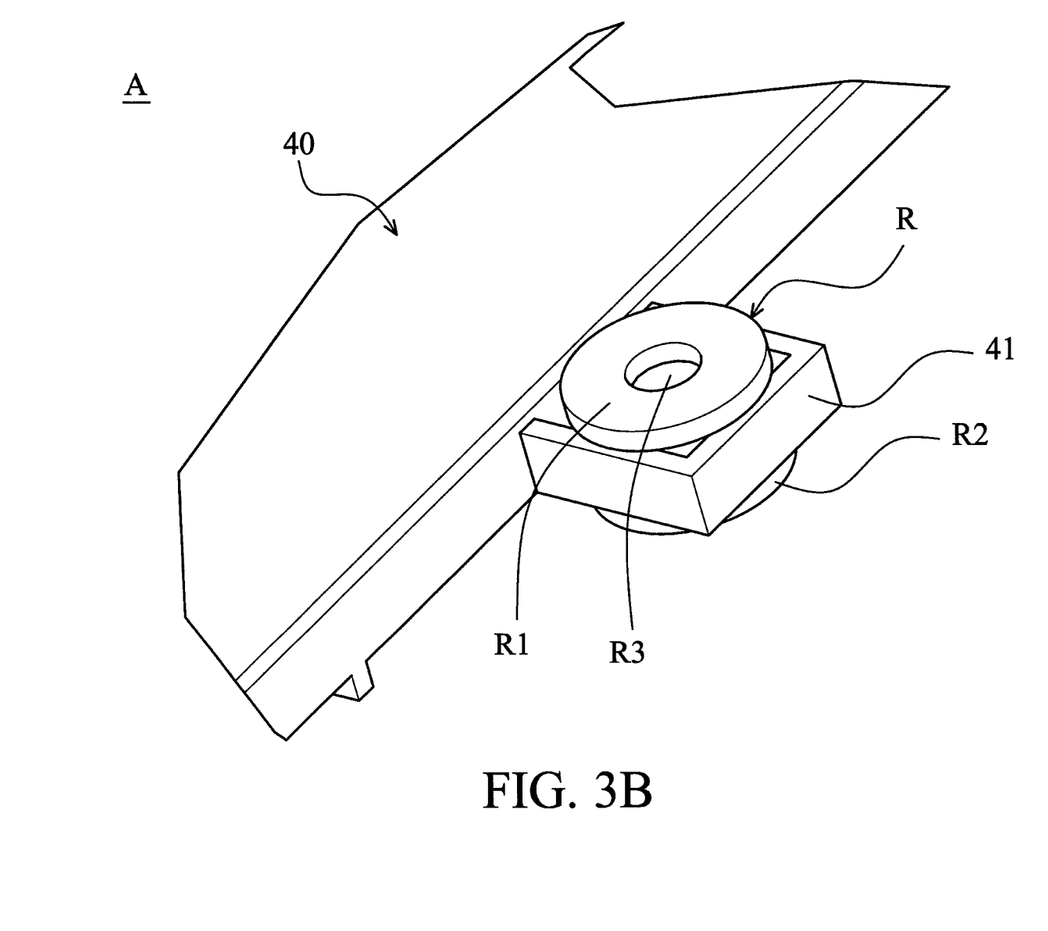
FIG. 3B is an enlarged view of the portion A in FIG. 3A.
Figure 4:
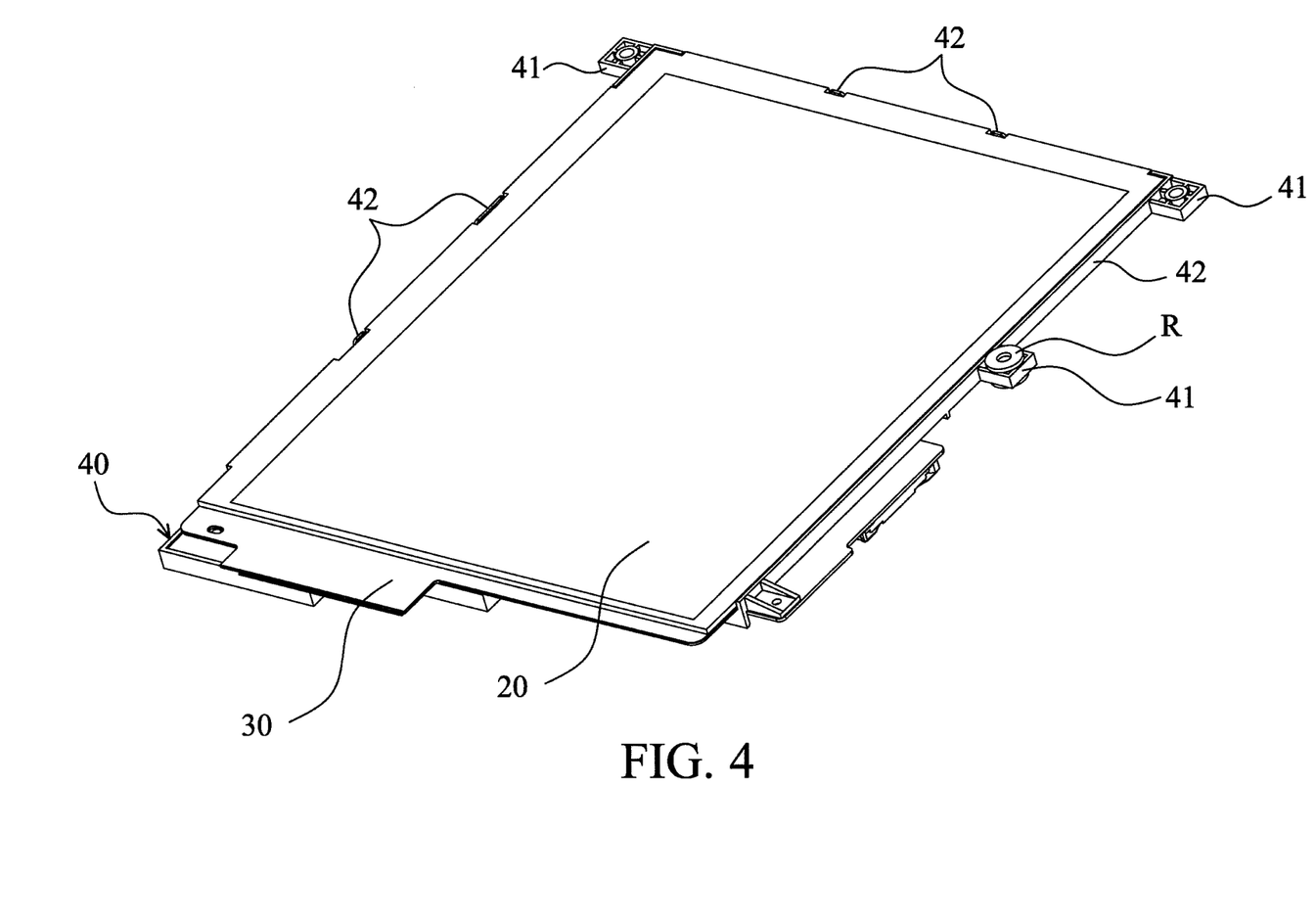
FIG. 4 is a perspective diagram of a display panel and a touch panel disposed on a frame according to an embodiment of the invention.

FIG. 3B is an enlarged view of the portion A in FIG. 3A, wherein the cushion R is joined through the tab 41 of the frame 40. As shown in FIG. 3B, the cushion R has a first contact portion R1 and a second contact portion R2 respectively protruding from the upper and lower sides of the tab 41. The first and second contact portions R1 and R2 of the cushion are respectively in contact with the front and rear cases 10 and 60 to absorb shock waves and protect the display and touch panels 20 and 30. Therefore, the frame 40 doesn't directly contact the front and rear cases 10 and 60. During assembly, a fastener is inserted through a hole R3 of the cushion R to connect the front case 10 with the rear case 60. Referring to FIG. 4, the display and touch panels 20 and 30 are restricted to a predetermined position on the frame 40 by the flanges 42, thus facilitating precise positioning and robust connection between the frame 40 and the display and touch panels 20 and 30.

Figure 5:
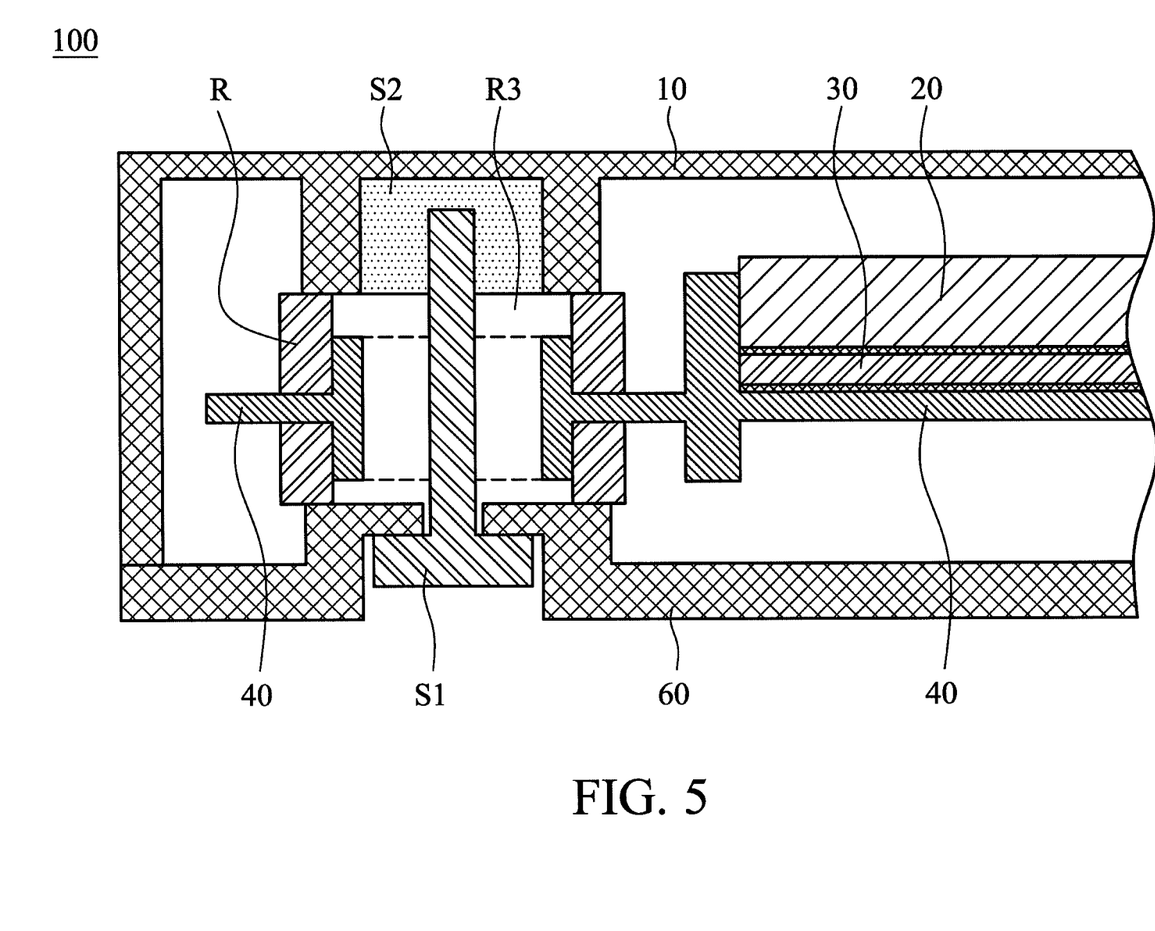
FIG. 5 is a sectional view of a display device according to another embodiment of the invention.

FIG. 5 is a sectional view of the display device 100 according to another embodiment of the invention, wherein a fastener S1 is inserted through the rear case 60 and the cushion R. As shown in FIG. 5, the fastener S1 is joined with a nut S2 on the front case 10, so as to firmly connect the front case 10 to the rear case 60 with the cushion R therebetween. In this embodiment, the cushion R is disposed between the front and rear cases 10 and 60, and the frame 40 is horizontally extended through the cushion R. Since the cushion R can space the frame 40 apart from the front and rear cases 10 and 60, external shock waves due to impact forces can be absorbed by the cushions R to protect the touch panels 20 and 30 from structural damage.

Figure 6:
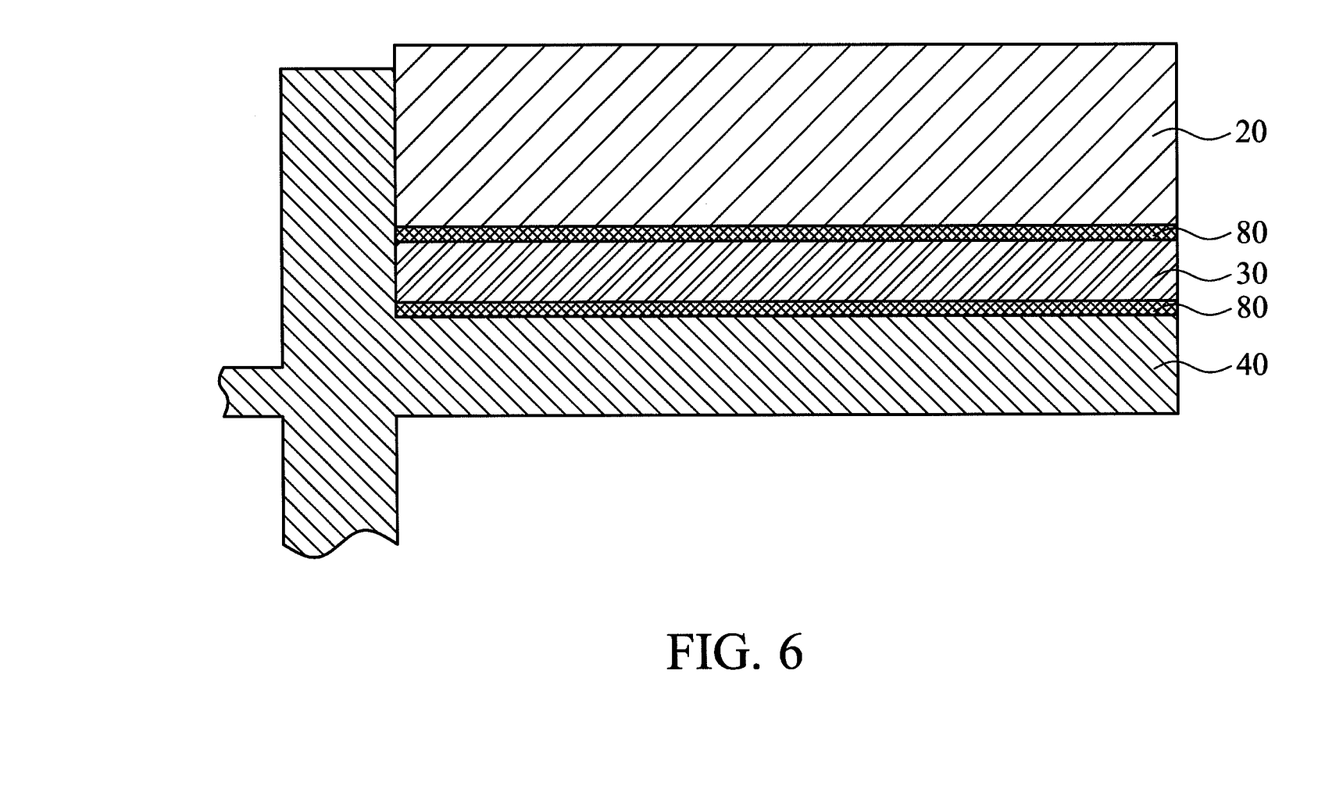
FIG. 6 is a sectional view of a display panel and a touch panel attached to a frame according to an embodiment of the invention.
Figure 7:
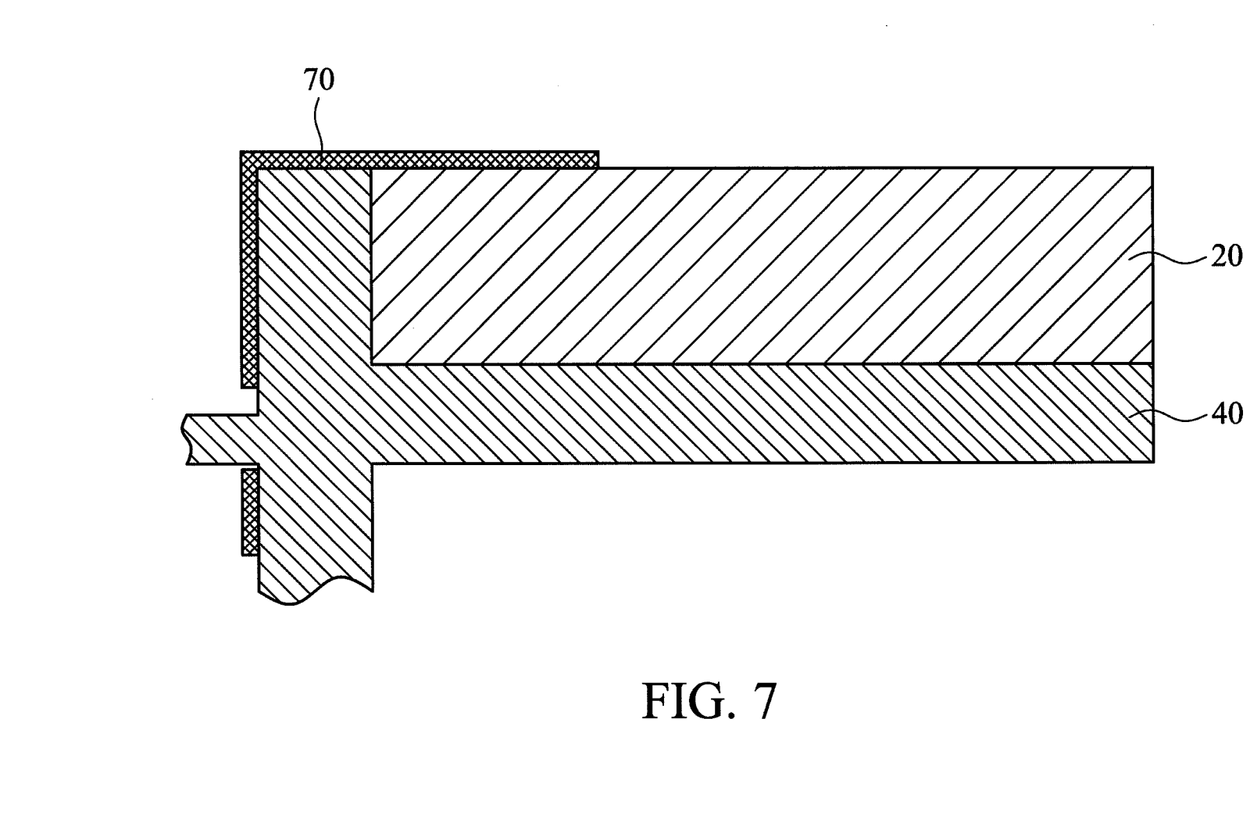
FIG. 7 is a sectional view of a fixture fixing a display panel to a frame according to an embodiment of the invention.

Referring to FIG. 6, the touch panel 30 can be attached to the display panel 20 and the frame 40 by adhesive tapes 80 or the display panel 20 may be directly attached to the frame 40 by adhesive tapes 80. In some embodiments, the display panel 20 may be fixed to the frame 40 by a fixture 70 which has an L-shaped cross-section, as shown in FIG. 7.

The invention provides a thin display device such as an e-reader or e-book device which comprises a frame between a front case and a rear case for holding and supporting a display panel, thus improving the structural strength and stiffness of the display device. Specifically, one or several cushions may be disposed on the frame to space the frame apart from the front and rear cases. Hence, external shock waves which may be directly transferred from the front and rear cases to the display panel can be efficiently decreased, thus preventing structural damage and functional failure of the display device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A display device, comprising:
a front case;
a rear case fixed to the front case;
a frame disposed between the front and rear cases;
a display panel disposed on the frame; and
a cushion disposed on the frame and contacting the front and rear cases and spacing the frame apart from the front and rear cases; and
a fastener inserted through the cushion and the frame to connect the rear case with the front case,
wherein the fastener is apart from the cushion.

2. The display device as claimed in claim 1, wherein the cushion comprises a first contact portion and a second contact portion protruding from opposite sides of the frame and respectively contacting the front and rear cases.

3. The display device as claimed in claim 2, wherein the first and second contact portions of the cushion respectively space the frame apart from the front and rear cases.

4. The display device as claimed in claim 1, further comprising a touch panel connected to the display panel.

5. The display device as claimed in claim 4, wherein the touch panel is disposed between the frame and the display panel and the touch panel doesn't directly contact the front and rear cases.

6. The display device as claimed in claim 4, wherein the touch panel is fixed to the display panel by an adhesive tape.

7. The display device as claimed in claim 4, wherein the touch panel is fixed to the frame by an adhesive tape.

8. The display device as claimed in claim 1, wherein the display panel is fixed to the frame by an adhesive tape.

9. The display device as claimed in claim 1, wherein the display device further comprises a fixture fixing the display panel to the frame.

10. The display device as claimed in claim 1, wherein the frame comprises a main body and a tab protruding from the main body, and the display panel is disposed on the main body, and the cushion is disposed through the tab.

11. The display device as claimed in claim 1, wherein the frame comprises a main body and a plurality of flanges formed at the edges of the main body to position the display panel on the main body.

12. The display device as claimed in claim 1, further comprising a circuit board disposed between the frame and the rear case.

13. The display device as claimed in claim 1, wherein the frame comprises plastic material.

14. The display device as claimed in claim 1, wherein the frame comprises carbon fiber or glass fiber.

15. The display device as claimed in claim 1, wherein the cushion comprises rubber.

16. The display device as claimed in claim 1, wherein the frame doesn't directly contact the front and rear cases.

17. The display device as claimed in claim 1, further comprising a fastener inserted through the rear case and the cushion and joined with a nut on the front case so as to firmly connect the front case to the rear case with the cushion therebetween.

18. The display device as claimed in claim 1, wherein the display panel doesn't directly contact the front and rear cases.

* * * * *